US012466997B2

(12) United States Patent
Enomoto et al.

(10) Patent No.: US 12,466,997 B2
(45) Date of Patent: Nov. 11, 2025

(54) SCINTILLATOR MATERIAL, RADIATION DETECTOR, AND METHOD FOR PRODUCING SCINTILLATOR MATERIAL

(71) Applicant: KOITO MANUFACTURING CO., LTD., Tokyo (JP)

(72) Inventors: Kiminori Enomoto, Shizuoka (JP); Hisayoshi Daicho, Shizuoka (JP)

(73) Assignee: KOITO MANUFACTURING CO., LTD., Tokyo (JP)

(*) Notice: Subject to any disclaimer, the term of this patent is extended or adjusted under 35 U.S.C. 154(b) by 317 days.

(21) Appl. No.: 18/281,054

(22) PCT Filed: Mar. 2, 2022

(86) PCT No.: PCT/JP2022/008851
§ 371 (c)(1),
(2) Date: Feb. 28, 2024

(87) PCT Pub. No.: WO2022/190991
PCT Pub. Date: Sep. 15, 2022

(65) Prior Publication Data
US 2025/0326967 A1    Oct. 23, 2025

(30) Foreign Application Priority Data

Mar. 11, 2021 (JP) ................................. 2021-039759
Jul. 13, 2021 (JP) ................................. 2021-116025

(51) Int. Cl.
C09K 11/77      (2006.01)
G01T 1/20       (2006.01)

(52) U.S. Cl.
CPC ........ *C09K 11/7733* (2013.01); *G01T 1/2018* (2013.01)

(58) Field of Classification Search
None
See application file for complete search history.

(56) References Cited

U.S. PATENT DOCUMENTS

2005/0040366 A1   2/2005   Yagi et al.
2014/0166889 A1   6/2014   Kang et al.
2019/0047903 A1   2/2019   Iwasaki et al.
(Continued)

FOREIGN PATENT DOCUMENTS

JP    2019-74358 A    5/2019
WO    03/083010 A1    10/2003
WO    2017/179609 A1  10/2017

OTHER PUBLICATIONS

International Search Report (PCT/ISA/210) dated May 24, 2022, issue by the International Searching Authority issued in PCT/JP2022/008851.
(Continued)

*Primary Examiner* — Edwin C Gunberg
(74) *Attorney, Agent, or Firm* — Sughrue Mion, PLLC

(57) ABSTRACT

Provided is a scintillator material that is excited by radiation rays to emit visible light. The scintillator material has a cristobalite structure obtained by crystallizing a part of silica. A fluorescent material $SrI_2:Eu^{2+}$ is incorporated into the cristobalite structure to form a nanocomposite, and the cristobalite structure contains an alkali metal ion.

10 Claims, 3 Drawing Sheets

(56) References Cited

U.S. PATENT DOCUMENTS

2019/0113635 A1     4/2019   Daicho
2023/0258830 A1*   8/2023   Daicho ............ C09K 11/77342
                                                                                         250/458.1

OTHER PUBLICATIONS

International Written Opinion (PCT/ISA/237) dated May 24, 2022, issue by the International Searching Authority issued in PCT/JP2022/008851.

* cited by examiner

SCINTILLATOR MATERIAL, RADIATION DETECTOR, AND METHOD FOR PRODUCING SCINTILLATOR MATERIAL

CROSS-REFERENCE TO RELATED APPLICATIONS

This application is a National Phase Entry of PCT International Application No. PCT/JP2022/008851 filed on Mar. 2, 2022, which claims priority to Japanese Patent Application No. 2021-039759 filed on Mar. 11, 2021, and Japanese Patent Application No. 2021-116025 filed on Jul. 13, 2021, the contents of all of which are incorporated herein by reference in their entirety.

TECHNICAL FIELD

The present invention relates to a scintillator material, a radiation detector, and a method for producing the scintillator material.

BACKGROUND ART

In the related art, in a radiation detector, an iodide such as NaI:Tl or CaI:Tl has been used as a scintillator material that is excited by radiation to emit visible light. The iodide-based scintillator material has a deliquescent property of hydration by taking in moisture in the air, and is required to be sealed in a container having high airtightness. Therefore, in a radiation detector according to the related art, the iodide-based scintillator material and a light detection unit are sealed in a container that is an aluminum can, a glass window member is bonded to a light-introducing port, and visible light is detected by the light detection unit disposed in the container.

However, since a trace amount of steam in the outside air penetrates into the container from a bonding portion between the container and the window member, the iodide-based scintillator deteriorates due to hydration, and it is required to appropriately perform management and maintenance of the radiation detector in order to use the radiation detector over a long period. In addition, in order to prevent the penetration of moisture into the container, it is required to seal the container with high airtightness, and there are problems that the number of steps in the production process increases and the workability deteriorates.

Therefore, Patent Literature 1 proposes that moisture resistance is improved by using a scintillator material that is a nanocomposite obtained by incorporating a fluorescent material $SrI_2:Eu^{2+}$ into a cristobalite structure.

CITATION LIST

Patent Literature

Patent Literature 1: JP2019-074358A

SUMMARY OF INVENTION

Technical Problem

However, in the technique of Patent Literature 1, it is required to incorporate $SrI_2:Eu^{2+}$ into the cristobalite structure to form a nanocomposite, the amount of $SrI_2:Eu^{2+}$ incorporated into $SiO_2$ is increased, and thus it is difficult to increase a radiation absorption rate and increase a light emission amount.

The present invention has been made in view of the above problems in the related art, and an object of the present invention is to provide a scintillator material that has excellent moisture resistance and favorably emits visible light by radiation, a radiation detector, and a method for producing the scintillator material.

Solution to Problem

In order to solve the above problems, a scintillator material of the present invention that is excited by radiation to emit visible light is provided. The scintillator material has a cristobalite structure obtained by crystallizing a part of silica, a fluorescent material $SrI_2:Eu^{2+}$ is incorporated into the cristobalite structure to form a nanocomposite, and the cristobalite structure contains an alkali metal ion.

In the scintillator material of the present invention, $SrI_2:Eu^{2+}$ is incorporated into the cristobalite structure, and the alkali metal ion is contained in the cristobalite structure, so that the moisture resistance of the fluorescent material is improved, and visible light can be favorably emitted by radiation.

In one aspect of the present invention, the alkali metal ion is any one of $Li^+$, $Na^+$, $K^+$, $Rb^+$, and $Cs^+$.

In one aspect of the present invention, the alkali metal ion is contained at a ratio of 0.1 mol % to 10 mol % with respect to Si contained in the cristobalite structure.

In one aspect of the present invention, the fluorescent material is a single crystal or a polycrystal.

In one aspect of the present invention, the silica is a porous body in which voids are distributed from a surface to an inside thereof.

In one aspect of the present invention, the porous body is an aggregate of $SiO_2$ particles having an average particle diameter (D50) of 2 μm to 50 μm.

In one aspect of the present invention, the $SiO_2$ particles contain an alkali metal component.

In one aspect of the present invention. Sr ions are contained at a ratio of 0.9 mol % to 15 mol %, I ions are contained at a ratio of 2.0 mol % to 40 mol %, and Eu ions are contained at a ratio of 0.1 mol % to 5.0 mol %, with respect to Si contained in the cristobalite structure.

A radiation detector of the present invention includes: the scintillator material according to any one of the above aspects; and a light detection unit configured to detect a wavelength of 400 nm or more and 500 nm or less.

A method for producing a scintillator material of the present invention includes: a powder preparation step of forming a raw material powder containing a fluorescent material $SrI_2:Eu^{2+}$ and an alkali metal material; a porous body formation step of forming silica that is a porous body in which voids are distributed from a surface to an inside thereof; and a heat treatment step of bringing the porous body into contact with the raw material powder and performing a heat treatment.

Advantageous Effects of Invention

The present invention can provide a scintillator material that has excellent moisture resistance and favorably emits visible light by radiation, a radiation detector, and a method for producing the scintillator material.

DESCRIPTION OF EMBODIMENTS

First Embodiment

Figure 1:
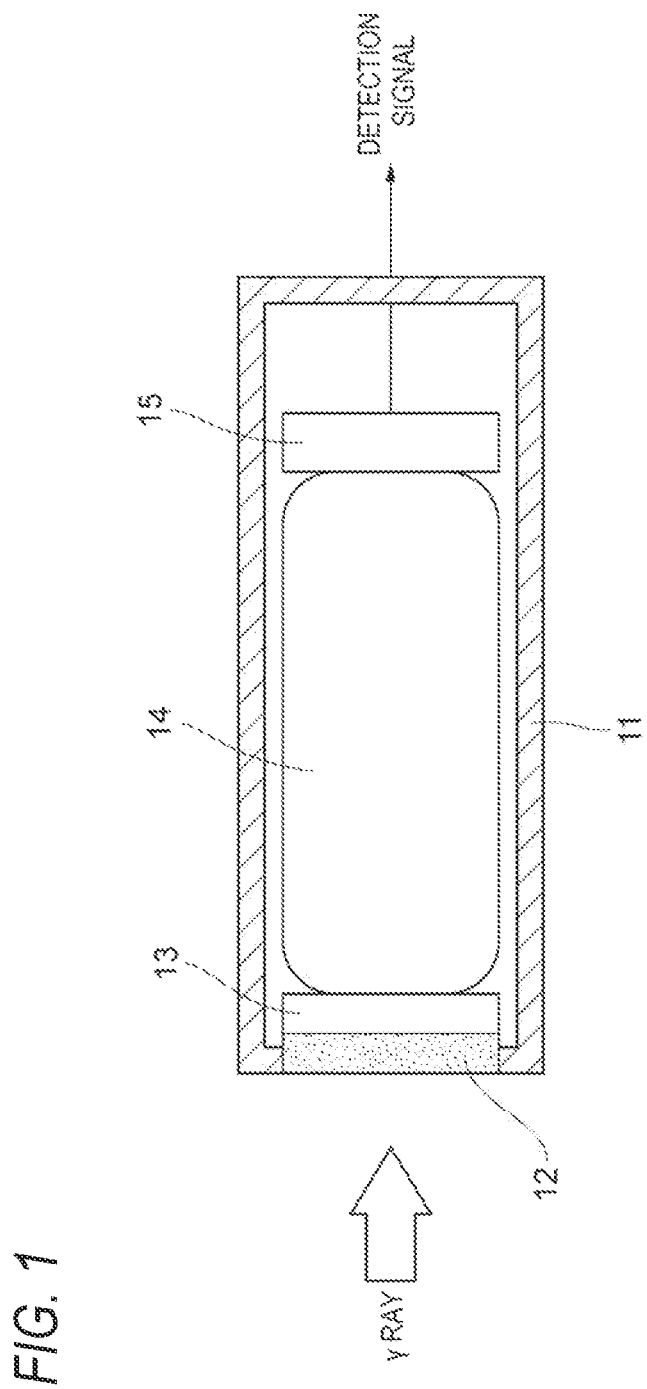
FIG. 1 is a schematic diagram showing a structure of a radiation detector 10 using a scintillator material according to a first embodiment.

Hereinafter, embodiments of the present invention will be described in detail with reference to the drawings. The same or equivalent components, members, and processes shown in the drawings are denoted by the same reference signs, and redundant description thereof will be omitted as appropriate. FIG. 1 is a schematic diagram showing a structure of a radiation detector 10 using a scintillator material according to the present embodiment. As shown in FIG. 1, the radiation detector 10 includes a container 11, a window member 12, a scintillator material 13, a photomultiplier tube (PMT) 14, and a bleeder circuit 15.

The container 11 is a substantially cylindrical member having an opening, and accommodates the scintillator material 13, the photomultiplier tube 14, and the bleeder circuit 15 therein. The window member 12 is airtightly fixed to the opening with an adhesive or the like. The material forming the container 11 is not limited, and aluminum can be used as an example. A shape of the container 11 is not limited to a cylindrical shape, and can be designed as appropriate in accordance with the shape and size of each member accommodated therein. A wiring hole (not shown) is formed in the container 11, and a wire is connected to the bleeder circuit 15 from the outside through the wiring hole.

The window member 12 is a plate-shaped member formed of a material transmitting radiation, and is disposed at the opening of the container 11 to airtightly seal the inside of the container 11. The material forming the window member 12 is not limited, and a known glass material can be used. An adhesive or the like is applied between an outer periphery of the window member 12 and the opening of the container 11, and the gap is sealed in order to prevent steam from entering the gap.

The scintillator material 13 is a member that is disposed between the window member 12 and the photomultiplier tube 14 and contains a fluorescent material that emits visible light by being irradiated with radiation. In the present embodiment, as the fluorescent material, a material, which is a nanocomposite obtained by incorporating single crystal or polycrystal $SrI_2:Eu^{2+}$ into a cristobalite structure obtained by crystallizing a part of silica as a matrix phase, is used. The cristobalite structure contains alkali metal ions.

The photomultiplier tube 14 is a member that detects a trace amount of photons and outputs an electric signal. As the structure of the photomultiplier tube 14, a known structure can be used, and as an example, a structure in which a photoelectric cathode, a plurality of secondary electron multiplication electrodes (dynodes), an anode, and other electrodes are enclosed in a high-vacuum glass container can be used. The scintillator material 13 is disposed on an entrance window side of the photomultiplier tube 14, and the bleeder circuit 15 is connected to an output side.

The bleeder circuit 15 is a member that supplies a voltage from a high-voltage power supply to the photomultiplier tube 14 via a plurality of dividing resistors and outputs a current from the photomultiplier tube 14. A plurality of voltages from the high-voltage power supply are supplied to respective dynodes of the photomultiplier tube 14. The output of the bleeder circuit 15 is transmitted to an external signal processing unit as a detection signal via a wire (not shown).

In the radiation detector 10 shown in FIG. 1, when radiation such as gamma rays is incident on the scintillator material 13 through the window member 12, the fluorescent material in the scintillator material 13 is excited and emits blue light having a wavelength range of 400 nm or more and 500 nm or less. The photons of the blue light emitted by the scintillator material 13 reach the photoelectric cathode from the entrance window of the photomultiplier tube 14, and are converted into electrons by the photoelectric cathode. When electrons generated in the photoelectric cathode collide with the dynode, a large number of electrons are emitted by the voltage applied to the dynode, and electrons are emitted in a chain among the plurality of dynodes, so that electrons generated by one photon are amplified like avalanche. The current generated by the electrons amplified by the photomultiplier tube 14 is transmitted to the external signal processing unit as a detection signal via the bleeder circuit 15, and the signal processing unit calculates the number of photons from a relation among the photons, the current, and the detection signal. The signal processing unit calculates the intensity of the radiation from the calculated number of photons.

Next, materials used for the scintillator material 13 of the present embodiment will be described in more detail. Silica has an amorphous structure having a basic skeleton in which $SiO_4$ tetrahedrons are connected by Si—O—Si bonds. A bonding angle of Si—O—Si is 145° ±10°. When silica is heated, a coefficient of thermal expansion is small up to around 1000° C., but the coefficient of thermal expansion gradually increases from around 1000° C. This is because active hydrogen is generated from OH groups on the silica surface, and Si—O—Si bonds are cleaved and rearranged in a part of the silica. At this time, the bonding angle of Si—O—Si is 180°, and large voids are generated in a $SiO_4$ connecting net. The voids become pockets by taking into metal cations such as $Sr^{2+}$, $Cs^+$, $Ca^{2+}$, $Eu^{2+}$, and $Tl^+$, and anions such as halogen, and these ions are incorporated into the $SiO_4$ connecting net.

The cations and anions in the incorporated ions are bonded to each other by thermal diffusion to generate ion crystal nuclei. It is considered that, with activation caused by the generation of the ion crystal nuclei, the silica having a matrix phase is also crystallized to generate cristobalite. In this way, it is presumed that the incorporation of the luminescent halide metal salt and the crystallization of $SiO_2$ occurred in parallel, and a nanocomposite type scintillator material was generated.

At a temperature at which the formation of the nanocomposite of $SiO_2$ proceeds, I in the raw material sublimates due to an excessively high temperature, and it is difficult to incorporate a sufficient amount of $SrI_2:Eu^{2+}$ crystals. Therefore, it is important that sublimation of I is prevented and synthesis is performed at a low temperature, and thus a large amount of $SrI_2:Eu^{2+}$ is contained in the cristobalite structure.

Examples of the alkali metal ions contained in the cristobalite structure include $Li^+$, $Na^+$, $K^+$. $Rb^+$, and $Cs^+$. The alkali metal ions contained in the cristobalite structure are preferably contained at a ratio of 0.01 mol or more and 1.00 mol or less (0.1 mol % or more and 10 mol % or less) with respect to 10 mol of Si.

When the amount of the alkali metal ions is less than 0.1 mol %, the amount of $SrI_2:Eu^{2+}$ incorporated into the cristobalite structure is small, and it may be difficult to increase the radiation absorption rate and the light emission intensity of visible light. When the amount of alkali metal ions is more than 10 mol %, the cristobalite structure cannot be formed, and $SiO_2$ and the alkali metal ions are vitrified, so that $SrI_2:Eu^{2+}$ cannot be incorporated therein, and radiation absorption and visible light emission may be difficult.

As described above, in the radiation detector 10 of the present embodiment, when the nanocomposite in which $SrI_2:Eu^{2+}$ is incorporated into the cristobalite structure is used as the scintillator material 13 and which contains the alkali metal ions, the moisture resistance can be excellent, visible light emitted by the radiation can be detected, and detection sensitivity of the radiation can be increased. In addition, since synthesis can be performed at a low temperature and sublimation of I can be prevented, a large amount of $SrI_2:Eu^{2+}$ can be contained in the cristobalite structure.

Second Embodiment

Next, a second embodiment of the present invention will be described. Description of contents redundant with the first embodiment will be omitted. In the present embodiment, a porous body of $SiO_2$ is used as the silica which is the matrix phase of the scintillator material 13.

The porous body is a molded body formed of silica which is a matrix phase of the scintillator material, and voids are distributed from the surface to the inside of the silica. The shape and structure of the porous body are not limited, and a plate-shaped molded body having a thickness of about 1 mm to 5 mm can be used. In addition, a method for forming the porous body is not limited, and an aggregate obtained by sintering $SiO_2$ particles having an average particle diameter (D50) of 2 µm to 50 µm can be used. The filling rate of the silica contained in the porous body is preferably about 30% to 80% in volume ratio. When the filling rate is less than 30%, the strength of the porous body may be insufficient and it may be difficult to handle the porous body. In addition, when the filling rate exceeds 80%, it may be difficult to incorporate the fluorescent material into the porous body.

In order to form an aggregate by calcining the $SiO_2$ particles, the $SiO_2$ particles preferably contain an alkali metal component. Examples of the alkali metal component contained in the $SiO_2$ particles include Li, Na, K, Rb, and Cs. The content of the alkali metal component contained in the $SiO_2$ particles is preferably 0.01 mol or more and 1.00 mol or less (0.1 mol % or more and 10 mol % or less) with respect to 10 mol of Si. When the alkali metal component is contained in the $SiO_2$ particles, the $SiO_2$ particles are sintered together, and a molded body that is a porous body having voids between the particles can be obtained.

In the method for producing the scintillator material of the present embodiment, a fluorescent material $SrI_2:Eu^{2+}$ and an alkali metal material are prepared, and pulverized/mixed in an inert gas atmosphere to form a raw material powder in the powder preparation step. In the porous body formation step, a mixed powder of $SiO_2$ particles and an alkali metal material is prepared, pulverized/mixed in an inert gas atmosphere, and then calcined in the air atmosphere to form silica that is a porous body. Next, in the heat treatment step, the raw material powder and the porous body are brought into contact with each other, and are heated and calcined in an inert atmosphere to obtain a scintillator material. A method for bringing the raw material powder into contact with the porous body is not limited, and the porous body may be disposed on the raw material powder. In the heat treatment step, a cristobalite structure obtained by crystallizing a part of silica that is a porous body is formed, and a fluorescent material $SrI_2:Eu^{2+}$ is incorporated into the cristobalite structure to form a nanocomposite. The cristobalite structure contains the alkali metal ions.

In the obtained scintillator material, Sr ions are contained at a ratio of 0.9 mol % to 15 mol %, I ions are contained at a ratio of 2.0 mol % to 40 mol %, and Eu ions are contained at a ratio of 0.1 mol % to 5.0 mol %, with respect to Si contained in the cristobalite structure. When the contents of the ions are less than lower limits of these numerical ranges, the incorporation amount of $SrI_2:Eu^{2+}$ may decrease, and the light emission amount may decrease. When the contents of the ions are more than upper limits of these numerical ranges, excessive elements may permeate out from the inside of the scintillator material, and cracks may occur from a portion, as a starting point, where the elements permeate out to cause particle cracking. When the particle cracking occurs, $SrI_2:Eu^{2+}$ incorporated into the cristobalite structure is exposed to the atmosphere, and the moisture resistance deteriorates. When the content of Sr ions is more than 15 mol %, the amount of SrI incorporated into $SiO_2$ may decrease, and the light emission performance may deteriorate. When the content of I ions is more than 40 mol %, the amount of SrI incorporated into $SiO_2$ may also decrease, and the light emission performance may also deteriorate. When the content of Eu ions is more than 5.0 mol %, concentration quenching may occur, and the light emission performance may deteriorate.

As described above, in the scintillator material and the method for producing the scintillator material according to the present embodiment, silica, which is a matrix phase, is formed of a porous body. Accordingly, the amount of a fluorescent material $SrI_2:Eu^{2+}$ incorporated into the cristobalite structure can be increased, the moisture resistance can be excellent, visible light emitted by radiation can be detected, and the detection sensitivity of radiation can be increased.

Third Embodiment

Figure 2:
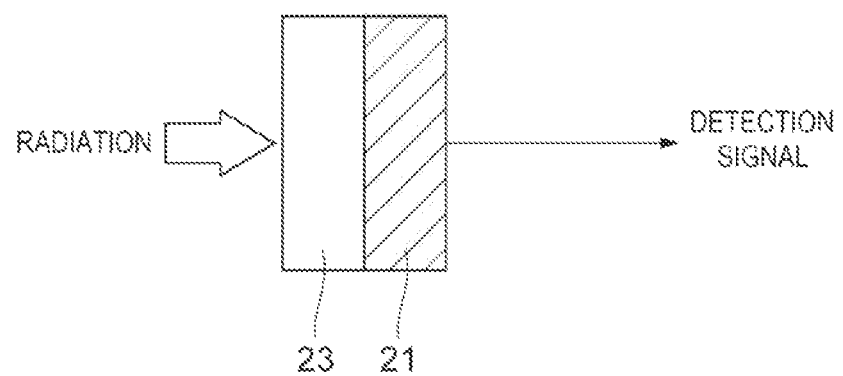
FIG. 2 is a schematic diagram showing a structure of a radiation detector 20 using a scintillator material according to a third embodiment.

Next, a third embodiment of the present invention will be described with reference to FIG. 2. Description of contents redundant with the first embodiment will be omitted. FIG. 2 is a schematic diagram showing a structure of a radiation detector 20 using a scintillator material according to the present embodiment. As shown in FIG. 2, the radiation detector 20 includes a light receiving element 21 and a scintillator material 23.

The light receiving element 21 is a member that is formed of a semiconductor material and generates electrons by receiving light A known light receiving element can be used as the light receiving element 21, and the material and structure are not limited. For example, a photo diode (PD) or an avalanche photo diode (APD) made of silicon or a III-V compound semiconductor material can be used. In the light receiving element 21, a wire is connected to an electrode (not shown), and a voltage or a current corresponding to the intensity of light is output through the wire.

The scintillator material 23 is a member that is disposed on a light receiving surface side of the light receiving element 21 and contains a fluorescent material that emits visible light by being irradiated with radiation. As in the first embodiment, a nanocomposite in which $SrI_2:Eu^{2+}$ is incorporated into the cristobalite structure and which contains alkali metal ions is also used as the scintillator material 23 in the present embodiment.

In the radiation detector 20 shown in FIG. 2, when radiation such as gamma rays is incident on the scintillator material 23, the fluorescent material in the scintillator material 23 is excited to emit blue light having a wavelength range of 400 nm or more and 500 nm or less. The photons of the blue light emitted by the scintillator material 23 reach a light receiving surface of the light receiving element 21, and a current or a voltage corresponding to the intensity of light is transmitted to the external signal processing unit as a detection signal. The signal processing unit calculates the number of photons and the intensity of radiation from the detection signal.

In the radiation detector 20 of the present embodiment, when the nanocomposite in which $SrI_2:Eu^{2+}$ is incorporated into the cristobalite structure and which contains the alkali metal ions is used as the scintillator material 23, the moisture resistance can also be excellent, visible light emitted by the radiation can also be detected, and detection sensitivity of the radiation can also be increased.

(Measurement of Light Emission Amount by Gamma Ray Irradiation)

As the scintillator material 13 of the radiation detector shown in FIG. 1, the materials of Examples 1 to 3 and Comparative Examples 1 to 4 described below were used, and the light emission amount caused by the gamma ray was measured. In the present embodiment, 662 keV of $^{137}Cs$ is used for the gamma ray source.

Example 1

The scintillator material 13 according to Example 1 is one in which a fluorescent material $SrI_2:Eu^{2+}$ is incorporated into the cristobalite structure and which contains Nat as the alkali metal ions. As raw materials, $SiO_2$, $SrI_2$ (melting point: 402° C.), $NH_4I$, $EuF_3$, and NaI were prepared, and precisely weighed such that the molar ratio thereof was 10:0.46:0.08:0.04:0.02. Then, the raw materials were placed in a quartz mortar in a nitrogen gas atmosphere and pulverized and mixed. Thereafter, the mixed powder was placed in an alumina crucible and calcined at 850° C. for 3 hours in a nitrogen atmosphere. The obtained calcined product was thoroughly washed with warm pure water to remove free iodide ions, thereby obtaining the scintillator material 13 in Example 1. When light emission caused by gamma ray irradiation was measured by the radiation detector of FIG. 1, a light emission amount of 26,500 [photons/Mev] was obtained. Since the raw material contains an alkali metal, the temperature for forming the cristobalite structure could be lowered to 850° C.

Example 2

The scintillator material 13 according to Example 2 is one in which a fluorescent material $SrI_2:Eu^{2+}$ is incorporated into the cristobalite structure and which contains $K^+$ as the alkali metal ions. As raw materials, $SiO_2$, $SrI_2$, $NH_4I$, $Eu_2O_3$, and KBr were prepared, and precisely weighed such that the molar ratio thereof was 10:0.50:0.04:0.015:0.10. Then, the raw materials were placed in a quartz mortar in a nitrogen gas atmosphere and pulverized and mixed. Thereafter, the mixed powder was placed in an alumina crucible and calcined at 850° C. for 3 hours in a nitrogen atmosphere. The obtained calcined product was thoroughly washed with warm pure water to remove free iodide ions, thereby obtaining the scintillator material 13 in Example 2. When light emission caused by gamma ray irradiation was measured by the radiation detector of FIG. 1, a light emission amount of 22,300 [photons/Mev] was obtained.

Example 3

The scintillator material 13 according to Example 3 is one in which a fluorescent material $SrI_2:Eu^{2+}$ is incorporated into the cristobalite structure and which contains $Cs^+$ as the alkali metal ions. As raw materials, $SiO_2$, $SrI_2$, $NH_4I$, $EuI_3$, and CsCl were prepared, and precisely weighed such that the molar ratio thereof was 10:0.40:0.10:0.06:1.80. Then, the raw materials were placed in a quartz mortar in a nitrogen gas atmosphere and pulverized and mixed. Thereafter, the mixed powder was placed in an alumina crucible and calcined at 900° C. for 3 hours in a nitrogen atmosphere. The obtained calcined product was thoroughly washed with warm pure water to remove free iodide ions, thereby obtaining the scintillator material 13 in Example 3. When light emission caused by gamma ray irradiation was measured by the radiation detector of FIG. 1, a light emission amount of 20,100 [photons/Mev] was obtained.

Comparative Example 1

The scintillator material 13 according to Comparative Example 1 is one in which a fluorescent material $SrI_2:Eu^{2+}$ is incorporated into the cristobalite structure and which does not contain alkali metal ions. As raw materials, $SiO_2$, $SrI_2$, $NH_4I$, and $EuF_3$ were prepared, and precisely weighed such that the molar ratio thereof was 10:0.46:0.28:0.04. Then, the raw materials were placed in a quartz mortar in a nitrogen gas atmosphere and pulverized and mixed. Thereafter, the mixed powder was placed in an alumina crucible and calcined at 1000° C. for 3 hours in a nitrogen atmosphere. The obtained calcined product was thoroughly washed with warm pure water to remove free iodide ions, thereby obtaining the scintillator material 13 in Comparative Example 1. When light emission caused by gamma ray irradiation was measured by the radiation detector of FIG. 1, a light emission amount of 12.000 [photons/Mev] was obtained.

Comparative Example 2

The scintillator material 13 according to Comparative Example 2 excessively contains Nat as the alkali metal ions. As raw materials. $SiO_2$, $SrI_2$, $NH_4I$, $EuF_3$, and NaI were prepared, and precisely weighed such that the molar ratio thereof was 10:0.41:0.04:0.02:2.40. Then, the raw materials were placed in a quartz mortar in a nitrogen gas atmosphere and pulverized and mixed. Thereafter, the mixed powder was placed in an alumina crucible and calcined at 850° C. for 3 hours in a nitrogen atmosphere. The obtained calcined product was thoroughly washed with warm pure water to remove free iodide ions, thereby obtaining the scintillator material 13 in Comparative Example 2. When light emission caused by gamma ray irradiation was measured by the radiation detector in FIG. 1, the light emission amount was 0 [photons/Mev].

Comparative Example 3

The scintillator material 13 according to Comparative Example 3 is one in which a fluorescent material $SrI_2:Eu^{2+}$ is incorporated into the cristobalite structure and which contains a trace amount of $Na^+$ as the alkali metal ions. As raw materials, $SiO_2$, $SrI_2$, $NH_4I$, $EuI_3$, and $NaI$ were prepared, and precisely weighed such that the molar ratio thereof was 10:0.38:0.02:0.01:0.01. Then, the raw materials were placed in a quartz mortar in a nitrogen gas atmosphere and pulverized and mixed. Thereafter, the mixed powder was placed in an alumina crucible and calcined at 850° C. for 3 hours in a nitrogen atmosphere. The obtained calcined product was thoroughly washed with warm pure water to remove free iodide ions, thereby obtaining the scintillator material 13 in Comparative Example 3. When light emission caused by gamma ray irradiation was measured by the radiation detector of FIG. 1, a light emission amount of 12.200 [photons/Mev] was obtained.

Comparative Example 4

A commercially available BGO ($Bi_4Ge_3O_{12}$) was used as the scintillator material 13. When light emission caused by gamma ray irradiation was measured by the radiation detector of FIG. 1, a light emission amount of 15,000 [photons/Mev] was obtained.

Table 1 shows the measurement results of the light emission amounts caused by the gamma ray irradiation in Examples 1 to 3 and Comparative Examples 1 to 4. As shown in Table 1, in Examples 1 to 3 in which alkali metal ions are contained in the cristobalite structure, the light emission amount is significantly improved compared with Comparative Example 1 in which the alkali metal ions are not contained and Comparative Example 4 which is a commercially available BGO. In Comparative Example 2 in which the scintillator material was produced by excessively containing $Na^+$ as an alkali metal ion, a fluorescent material $SrI_2:Eu^{2+}$ was not incorporated into the cristobalite structure as described later, and the radiation could not be absorbed to emit visible light. In addition, in Comparative Example 3 in which a trace amount of alkali metal ions are contained, only the same light emission amount as in Comparative Example 1 was obtained.

tion scintillator 32, an evaluation sample 33, a light shielding sheet 34, and a radiation source 35.

The photomultiplier tube 31 is a member that detects a trace amount of photons and outputs an electric signal. The detection scintillator 32 is disposed in the entrance window of the photomultiplier tube 31, is a member containing BGO, and is excited by radiation emitted from the radiation source 35 to emit visible light. The evaluation sample 33 is the scintillator material produced in each of the above-described Examples 1 to 3 and Comparative Examples 1 to 3, and is disposed between the photomultiplier tube 31 and the detection scintillator 32. The light shielding sheet 34 is a sheet-shaped member formed of a material that blocks visible light and transmits radiation, and is disposed in a manner of covering the entrance window of the photomultiplier tube 31 and the detection scintillator 32. The light shielding sheet 34 is sandwiched between the detection scintillator 32 and the evaluation sample 33. The radiation source 35 is a device for emitting radiation, and 60 keV of $^{241}Am$ is used in the present embodiment.

Figure 3:
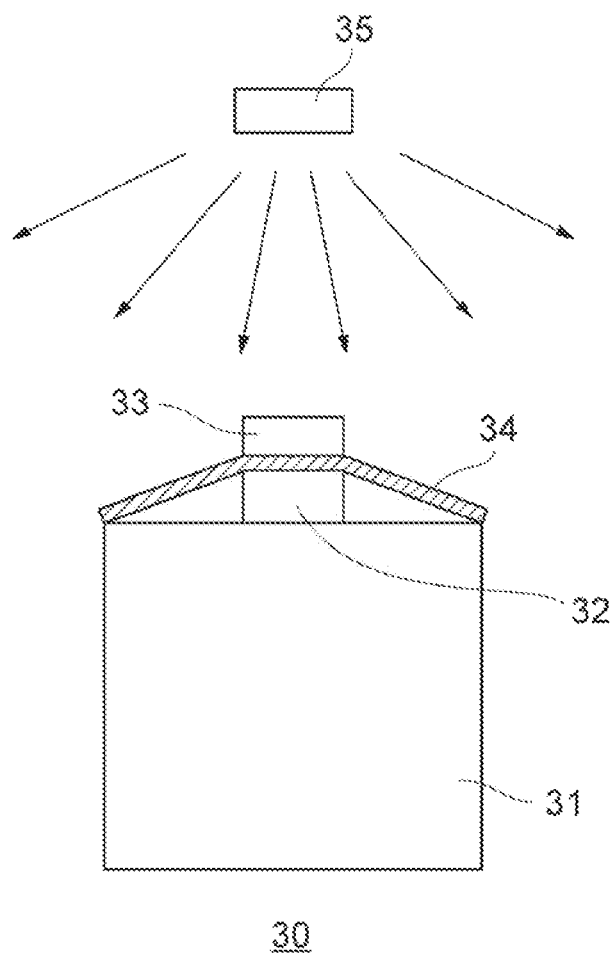
FIG. 3 is a schematic diagram showing a measurement device 30 for a gamma ray absorption rate of the scintillator material.

In the measurement device 30 shown in FIG. 3, the gamma ray emitted from the radiation source 35 is transmitted through the evaluation sample 33 and the light shielding sheet 34 and reaches the detection scintillator 32. In the detection scintillator 32, BGO is excited by the gamma ray to emit visible light. The photons emitted from the detection scintillator 32 reach the photomultiplier tube 14 and are output to the signal processing unit as a detection signal. The signal processing unit calculates the number of photons based on the detection signal.

At this time, the fluorescent material is also excited to emit visible light by the gamma ray incident on the evaluation sample 33. However, since the light is blocked by the light shielding sheet 34, photons incident on the photomultiplier tube 31 are only the photons emitted by the detection scintillator 32. Therefore, by comparing the number of photons detected by the photomultiplier tube 31, the amount of gamma rays absorbed by the evaluation sample 33 can be measured.

In the measurement device 30 shown in FIG. 3, a value obtained by measuring the light emission amount of the detection scintillator 32 by the photomultiplier tube 31 in a state in which the evaluation sample 33 is removed is set as a reference value. In addition, in the measurement device 30, in a state in which Examples 1 to 3 and Comparative Examples 1 to 3 were placed as the evaluation sample 33, the light emission amount of the detection scintillator 32 was

TABLE 1

| Sample | Example 1 | Example 2 | Example 3 | Comparative Example 1 | Comparative Example 2 | Comparative Example 3 | Comparative Example 4 |
|---|---|---|---|---|---|---|---|
| Light emission amount (Photons/Mev.) | 26,500 | 22,300 | 20,100 | 12,000 | 0 | 12,200 | 15,000 |

(Measurement of Gamma Ray Absorption in Scintillator Material)

Next, the gamma ray absorption rates of the scintillator materials produced in Examples 1 to 3 and Comparative Examples 1 to 3 were measured. FIG. 3 is a schematic diagram showing a measurement device 30 for the gamma ray absorption rate of the scintillator material. As shown in FIG. 3, the measurement device 30 for the gamma ray absorption rate includes a photomultiplier tube 31, a detecmeasured by the photomultiplier tube 31, and the gamma ray absorption rate was calculated by comparison with the reference value. Here, the number of detected photons (NA) at the reference value is set to 100% and a ratio R (NB/NA) of the number of detected photons (NB) in a state in which the evaluation sample 33 is placed to the number of detected photons (NA) at the reference value is determined, and a gamma ray absorption rate $R_A$ is calculated as $R_A=(100-R)$ %.

TABLE 2

| Sample | Example 1 | Example 2 | Example 3 | Comparative Example 1 | Comparative Example 2 | Comparative Example 3 |
|---|---|---|---|---|---|---|
| Gamma ray absorption rate (%) | 22.3 | 20.5 | 19.7 | 12.1 | 1.3 | 12.2 |

As shown in Table 2, it can be seen that in Examples 1 to 3, about 20% or more of the gamma rays are absorbed by the scintillator material as the evaluation sample 33, the cristobalite structure contains alkali metal ions, a fluorescent material $SrI_2:Eu^{2+}$ is favorably incorporated into the cristobalite structure, and the fluorescent material is excited with high efficiency by radiation to emit visible light. In contrast, it can be seen that in Comparative Example 1 in which no alkali metal is contained and Comparative Example 3 in which a trace amount of alkali metal ions is contained, the absorption of gamma rays is about 12%, and the efficiency of emitting visible light by excitation with radiation is low. In Comparative Example 2 in which the scintillator material was produced by excessively containing alkali metal ions. $SrI_2:Eu^{2+}$ was not incorporated, and therefore radiation was hardly absorbed.

Analysis Results of Examples 1 to 3 and Comparative Examples 1 to 3

Next, regarding the scintillator materials produced in Examples 1 to 3 and Comparative Examples 1 to 3, the ratios of the elements contained were measured using the flame atomic absorption spectroscopy. A fluorescent X-ray device (RIX 1000 manufactured by Rigaku Corporation) was used for the measurement. The elements to be measured, the monochromator used for the measurement, the 2θ measurement range [deg.], and the stepsize [deg.] are shown in Table 3. Table 4 shows the measurement results of Examples 1 to 3 and Comparative Examples 1 to 3. In Table 4, the amount of each element in the scintillator material is indicated by the number of moles when the amount of the Si element is 10 mol. Therefore, the value obtained by multiplying the numerical value shown in Table 4 by 10 is 10 mol % with respect to Si.

TABLE 3

| Element | Monochromator | 2θ measurement range [deg.] | Stepsize [deg.] |
|---|---|---|---|
| Sr | LiF | 23.000-27.00 | 0.02 |
| I | LiF | 10.00-14.00 | 0.02 |
| Si | PET | 106.00-112.00 | 0.05 |
| Eu | LiF | 61.00-66.00 | 0.02 |

As shown in Table 4, in Examples 1 to 3, $Na^+$, $K^+$, and $Cs^+$, which are alkali metal ions, were contained in an amount of 0.01 mol (0.1 mol %), 0.05 mol (0.5 mol %), and 0.90 mol (9.0 mol %), respectively, and accordingly, the amount of each of Sr and I is larger than that of Comparative Examples 1 to 3. Therefore, it can be seen that when the cristobalite structure contains 0.1 mol % to 10 mol % of alkali metal ions with respect to Si, the incorporation amount of the fluorescent material $SrI_2:Eu^{2+}$ can be increased. In Comparative Example 1, alkali metal ions are not contained, and in Comparative Example 3, the amount of $Na^+$, which is an alkali metal ion, is as small as 0.005 mol (0.05 mol %). Therefore, the content of each of Sr and I is smaller than that of Examples 1 to 3.

In Comparative Example 2, $SrI_2$ contained in the raw material is not detected from the sample (ND: Not Detectable). That is, since 1.20 mol (12.0 mol %) of Nat which is an alkali metal ion, is excessively contained, $SiO_2$ and Na are vitrified, and the cristobalite structure cannot be formed. Therefore, it can be confirmed that a fluorescent material $SrI_2:Eu^{2+}$ is not incorporated into the scintillator material.

Example 4

The scintillator material 13 according to Example 4 is one in which silica that is a porous body is used and a fluorescent material $SrI_2:Eu^{2+}$ is incorporated into the cristobalite structure and which contains $Na^+$ as the alkali metal ions. First, in the porous body formation step, amorphous $SiO_2$ and NaI were prepared and precisely weighed such that the molar ratio thereof was 10/0.1, followed by being placed into a quartz mortar in a nitrogen gas atmosphere and being pulverized/mixed. Thereafter, the mixed powder was uniaxially molded in a die, and the molded body was placed in an inert container such as a platinum crucible and sintered in an air atmosphere at 700° C. for 1 hour to obtain a porous body having a diameter of 20 mm and a thickness of 3 mm.

Next, in the powder preparation step. $SrI_2$. $NH_4I$, $EuF_3$, and NaI were prepared as raw materials and precisely weighed such that the molar ratio thereof was 0.46:0.08:0.04:0.02, and the raw materials were placed into a quartz mortar in a nitrogen gas atmosphere and pulverized and mixed, thereby obtaining a raw material powder.

TABLE 4

| Element | Example 1 | Example 2 | Example 3 | Comparative Example 1 | Comparative Example 2 | Comparative Example 3 |
|---|---|---|---|---|---|---|
| Si | 10 | 10 | 10 | 10 | 10 | 10 |
| Sr | 0.38 | 0.37 | 0.34 | 0.29 | ND | 0.29 |
| I | 0.81 | 0.79 | 0.78 | 0.59 | ND | 0.60 |
| Eu | 0.02 | 0.03 | 0.05 | 0.02 | 0.01 | 0.01 |
| Na | 0.01 | — | — | — | 1.20 | 0.005 |
| K | — | 0.05 | — | — | — | — |
| Cs | — | — | 0.90 | — | — | — |
| F | ND | — | — | ND | ND | — |
| Cl | — | — | ND | — | — | — |
| Br | — | ND | — | — | — | — |

Thereafter, in the heat treatment step, the porous body was placed on the raw material powder, followed by calcining at 850° C. for 3 hours in a nitrogen atmosphere. After calcining, the porous body placed on the raw material powder was taken out and washed with warm pure water to remove free iodide ions, thereby obtaining the scintillator material 13 in Example 4. When light emission caused by gamma ray irradiation was measured by the radiation detector in FIG. 1, a light emission amount of 28,500 [photons/Mev] was obtained. When the gamma ray absorption rate was measured by the above-described method using the measurement device 30 in FIG. 3, the gamma ray absorption rate $R_A$ was 26.3%.

Example 5

The scintillator material 13 according to Example 5 is one in which silica that is a porous body is used and a fluorescent material $SrI_2:Eu^{2+}$ is incorporated into the cristobalite structure and which contains $K^+$ as the alkali metal ions. First, in the porous body formation step, amorphous $SiO_2$ and KI were prepared and precisely weighed such that the molar ratio thereof was 10/0.1, followed by being placed into a quartz mortar in a nitrogen gas atmosphere and being pulverized/mixed. Thereafter, the mixed powder was placed on a quartz plate having a diameter of 20 mm and a thickness of 2 mm, and heated at 680° C. for 1 hour in an air atmosphere, thereby obtaining a porous body having a coating film thickness of 2 mm on the quartz plate.

Next, in the powder preparation step, $SrI_2$, $NH_4I$, $Eu_2O_3$, and KBr were prepared as raw materials and precisely weighed such that the molar ratio thereof was 0.50:0.04: 0.015:0.10, the raw materials were placed into a quartz mortar in a nitrogen gas atmosphere and pulverized and mixed, thereby obtaining a raw material powder.

Thereafter, in the heat treatment step, the porous body was placed on the raw material powder, followed by calcining at 850° C. for 3 hours in a nitrogen atmosphere. After calcining, the porous body placed on the raw material powder was taken out and washed with warm pure water to remove free iodide ions, thereby obtaining the scintillator material 13 in Example 5. When light emission caused by gamma ray irradiation was measured by the radiation detector in FIG. 1, a light emission amount of 24,300 [photons/Mev] was obtained. When the gamma ray absorption rate was measured by the above-described method using the measurement device 30 in FIG. 3, the gamma ray absorption rate $R_A$ was 24.5%.

Example 6

The scintillator material 13 according to Example 6 is one in which silica that is a porous body is used and a fluorescent material $SrI_2:Eu^{2+}$ is incorporated into the cristobalite structure and which contains $Cs^+$ as the alkali metal ions. First, in the porous body formation step, amorphous $SiO_2$ and $Cs^+$ were prepared and precisely weighed such that the molar ratio thereof was 10/0.1, followed by being placed into a quartz mortar in a nitrogen gas atmosphere and being pulverized/mixed. Thereafter, the mixed powder was placed on borosilicate glass having a diameter of 24 mm and a thickness of 1 mm, followed by calcining in an air atmosphere at 650° C. for 1 hour, and a porous body having a coating film thickness of 0.5 mm on the borosilicate glass was obtained.

Next, in the powder preparation step, $SrI_2$, $NH_4I$, $EuI_3$, and CsCl were prepared as raw materials and precisely weighed such that the molar ratio thereof was 0.40:0.10: 0.06:1.80, the raw materials were placed into a quartz mortar in a nitrogen gas atmosphere and pulverized and mixed, thereby obtaining a raw material powder.

Thereafter, in the heat treatment step, the porous body was placed on the raw material powder, followed by calcining at 700° C. for 10 hours in a nitrogen atmosphere. After calcining, the porous body placed on the raw material powder was taken out and washed with warm pure water to remove free iodide ions, thereby obtaining the scintillator material 13 in Example 6. When light emission caused by gamma ray irradiation was measured by the radiation detector in FIG. 1, a light emission amount of 22,100 [photons/Mev] was obtained.

When the gamma ray absorption rate was measured by the above-described method using the measurement device 30 in FIG. 3, the gamma ray absorption rate $R_A$ was 21.7%.

Comparative Example 5

The scintillator material 13 according to Comparative Example 5 is one in which a quartz plate having no void therein is used, and a fluorescent material $SrI_2:Eu^{2+}$ is incorporated into the cristobalite structure. $SrI_2$, $NH_4I$, and $EuF_3$ were prepared as raw materials and precisely weighed such that the molar ratio thereof was 0.46:0.28:0.04, and the raw materials were placed into a quartz mortar in a nitrogen gas atmosphere and pulverized and mixed. Thereafter, the quartz plate was placed on the raw material powder, followed by calcining at 1000° C. for 3 hours in a nitrogen atmosphere. After calcining, the quartz plate placed on the raw material powder was taken out and washed with warm pure water to remove free iodide ions, thereby obtaining the scintillator material 13 in Comparative Example 5. When light emission caused by gamma ray irradiation was measured by the radiation detector in FIG. 1, a light emission amount of 13,000 [photons/Mev] was obtained. When the gamma ray absorption rate was measured by the above-described method using the measurement device 30 in FIG. 3, the gamma ray absorption rate $R_A$ was 14.1%.

Regarding Examples 4 to 6 and Comparative Example 5, Table 5 shows the measurement results of the light emission amount caused by gamma ray irradiation using the radiation detector in FIG. 1. Table 6 shows the measurement results of the gamma ray absorption rate $R_A$ using the measurement device 30 in FIG. 3.

TABLE 5

| Sample | Example 4 | Example 5 | Example 6 | Comparative Example 5 |
|---|---|---|---|---|
| Light emission amount (Photons/Mev.) | 28,500 | 24,300 | 22,100 | 13,000 |

TABLE 6

| Sample | Example 4 | Example 5 | Example 6 | Comparative Example 5 |
|---|---|---|---|---|
| Gamma ray absorption rate (%) | 26.3 | 24.5 | 21.7 | 14.1 |

Analysis Results of Examples 4 to 6 and Comparative Example 5

Next, regarding the scintillator materials produced in Examples 4 to 6 and Comparative Example 5, the ratios of the elements contained therein were measured using the frame atomic absorption spectroscopy. A fluorescent X-ray device (RIX 1000 manufactured by Rigaku Corporation) was used for the measurement. Table 7 shows the measurement results of Examples 4 to 6 and Comparative Example 5. In Table 7, the amount of each element in the scintillator material is indicated by the number of moles when the amount of the Si element is 10 mol. Therefore, the value obtained by multiplying the numerical value shown in Table 7 by 10 is mol % with respect to Si.

TABLE 7

| Element | Example 4 | Example 5 | Example 6 | Comparative Example 5 |
|---|---|---|---|---|
| Si | 10 | 10 | 10 | 10 |
| Sr | 0.46 | 0.41 | 0.40 | 0.34 |
| I | 0.92 | 0.82 | 0.80 | 0.68 |
| Eu | 0.02 | 0.03 | 0.05 | 0.02 |
| Na | 0.01 | — | — | — |
| K | — | 0.05 | — | — |
| Cs | — | — | 0.90 | — |
| F | ND | — | — | ND |
| Cl | — | — | ND | — |
| Br | — | ND | — | — |

As shown in Table 7, in Examples 4 to 6, Na$^+$, K$^+$, and Cs$^+$, which are alkali metal ions, are contained in an amount of 0.01 mol (0.1 mol %), 0.05 mol (0.5 mol %), and 0.90 mol (9.0 mol %), respectively, and accordingly, the amount of each of Sr and I is about 1.4 times larger than that of Comparative Example 5. In addition, Sr and I are contained in amounts equivalent to or more than those in Examples 1 to 3 shown in Table 4. Therefore, it can be seen that the amount of the fluorescent material SrI$_2$:Eu$^{2+}$ incorporated into the cristobalite structure can be increased by using a porous body in which voids are distributed from the surface to the inside as silica that is a matrix phase. Accordingly, the radiation absorption rate of the scintillator material 13 can be increased, and the light emission amount of the fluorescent material can be improved.

The present invention is not limited to the above-described embodiments, and various modifications can be made within the scope of the claims. Embodiments obtained by appropriately combining the technical means disclosed in different embodiments are also included in the technical scope of the present invention.

REFERENCE SIGNS LIST 10, 20 radiation detector
30 measurement device
11 container
12 window member
13, 23 scintillator material
14, 31 photomultiplier tube
15 bleeder circuit
21 light receiving element
32 detection scintillator
33 evaluation sample
34 light shielding sheet
35 radiation source

The invention claimed is:

1. A scintillator material that is excited by radiation to emit visible light, the scintillator material comprising:
    a cristobalite structure obtained by crystallizing a part of silica,
    wherein a fluorescent material SrI$_2$:Eu$^{2+}$ is incorporated into the cristobalite structure to form a nanocomposite, and
    the cristobalite structure contains an alkali metal ion.

2. The scintillator material according to claim 1, wherein the alkali metal ion is any one of Li$^+$, Na$^+$, K$^+$, Rb$^+$, and Cs$^+$.

3. The scintillator material according to claim 1, wherein the alkali metal ion is contained at a ratio of 0.1 mol % to 10 mol % with respect to Si contained in the cristobalite structure.

4. The scintillator material according to claim 1, wherein the fluorescent material is contained in a form of a single crystal or a polycrystal.

5. The scintillator material according to claim 1, wherein the silica is a porous body in which voids are distributed from a surface to an inside thereof.

6. The scintillator material according to claim 5, wherein the porous body is an aggregate of amorphous SiO$_2$ particles having an average particle diameter (D50) of 2 µm to 50 µm.

7. The scintillator material according to claim 6, wherein the SiO$_2$ particles contain an alkali metal component.

8. The scintillator material according to claim 5, wherein Sr ions are contained at a ratio of 0.9 mol % to 15 mol %, I ions are contained at a ratio of 2.0 mol % to 40 mol %, and Eu ions are contained at a ratio of 0.1 mol % to 5.0 mol %, with respect to Si contained in the cristobalite structure.

9. A radiation detector comprising:
    the scintillator material according to claim 1; and
    a light detection unit configured to detect a wavelength of 400 nm or more and 500 nm or less.

10. A method for producing a scintillator material, the method comprising:
    a powder preparation step of forming a raw material powder containing a fluorescent material SrI$_2$:Eu$^{2+}$ and an alkali metal material;
    a porous body formation step of forming silica that is a porous body in which voids are distributed from a surface to an inside thereof; and
    a heat treatment step of bringing the porous body into contact with the raw material powder and performing a heat treatment.

* * * * *